(12) United States Patent
Zhao

(10) Patent No.: US 7,840,743 B2
(45) Date of Patent: Nov. 23, 2010

(54) DOUBLE NETWORK PHYSICAL ISOLATION CIRCUIT

(75) Inventor: Xiang-Ming Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 197 days.

(21) Appl. No.: 12/199,776

(22) Filed: Aug. 27, 2008

(65) Prior Publication Data

US 2010/0005216 A1    Jan. 7, 2010

(30) Foreign Application Priority Data

Jul. 2, 2008    (CN)   ......................... 2008 1 0302501

(51) Int. Cl.
    *G06F 13/14*    (2006.01)
(52) U.S. Cl. ....................... 710/316; 710/306
(58) Field of Classification Search ................. 710/305, 710/306, 316, 317, 31.38
    See application file for complete search history.

(56) References Cited

U.S. PATENT DOCUMENTS

| | | | | |
|---|---|---|---|---|
| 5,014,242 A | * | 5/1991 | Akimoto et al. | 365/63 |
| 5,392,252 A | * | 2/1995 | Rimpo et al. | 365/230.02 |
| 5,802,395 A | * | 9/1998 | Connolly et al. | 710/14 |
| 5,987,623 A | * | 11/1999 | Ushida | 714/6 |
| 6,526,473 B1 | * | 2/2003 | Kim | 711/105 |
| 6,636,933 B1 | * | 10/2003 | MacLellan et al. | 710/317 |
| 6,757,777 B1 | * | 6/2004 | Griessbach et al. | 710/316 |
| 7,075,808 B2 | * | 7/2006 | Klein | 365/63 |
| 7,093,066 B2 | * | 8/2006 | Klein | 711/105 |
| 7,245,606 B2 | * | 7/2007 | Barre et al. | 370/351 |

\* cited by examiner

*Primary Examiner*—Mark Rinehart
*Assistant Examiner*—Trisha Vu
(74) *Attorney, Agent, or Firm*—Clifford O. Chi

(57) ABSTRACT

A double network physical isolation circuit includes a north bridge chip, a bus switch circuit, a first memory, and a second memory. The bus switch circuit includes a first and a second bus switch chip. The first and second memories are connected to different networks. The north bridge chip is connected to the first and second memory. When the bus switch circuit receives a high level signal, the first input pin of the first bus switch chip is in electrical communication with the first output pin of the first bus switch chip, and the first memory is activated. The second memory is grounded through the second bus switch chip. When the bus switch circuit receives a low level signal, the second input pin is in electrical communication with the second output pin of the first bus switch chip, and the second memory is activated. The first memory is grounded through the second bus switch chip.

7 Claims, 2 Drawing Sheets

DOUBLE NETWORK PHYSICAL ISOLATION CIRCUIT

BACKGROUND

1. Field of the Invention

The present disclosure relates to a double network physical isolation circuit.

2. Description of Related Art

The internet brings not only convenience but also security risks. Two popular ways for providing internet security are software logistic isolation and network physical isolation. Software logistic isolation is susceptible to hacking and cannot satisfy high security demands of important networks. Although a typical network physical isolation system can ensure data security by storing important data in an internal network insulated from the internet, it requires two terminals to insulate different networks, thus wasting resources.

What is needed, therefore, is a single circuit which can efficiently insulate different networks on a terminal.

DETAILED DESCRIPTION OF THE EMBODIMENTS

Figure 1:
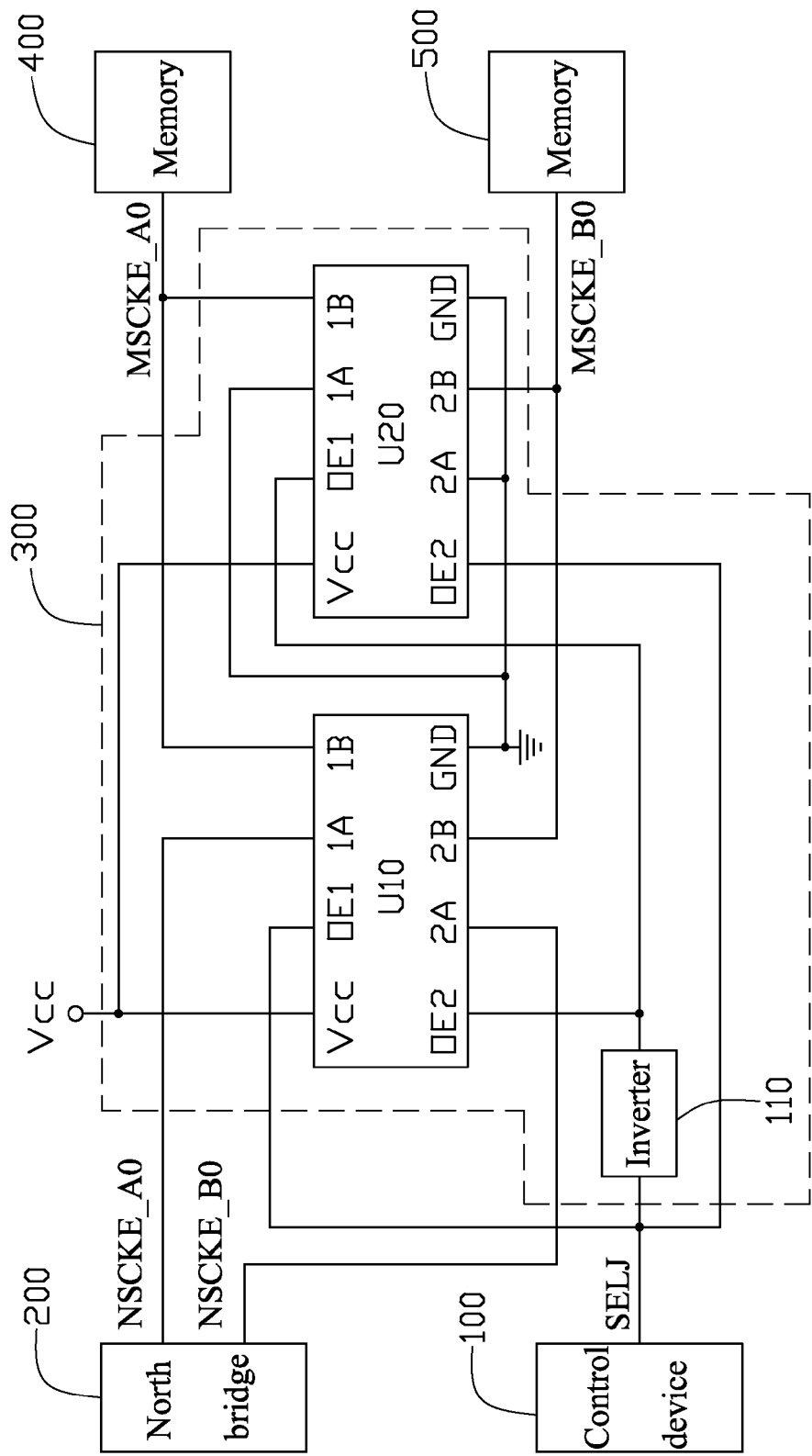
FIG. 1 is a circuit diagram of a first embodiment of a double network physical isolation circuit.

Referring to FIG. 1, a first embodiment of a double network physical isolation circuit includes a control device 100, a north bridge chip 200, a bus switch circuit 300, a first memory 400 and a second memory 500. In the first embodiment, the first memory 400 is configured for connecting to an internal network and a second memory is configured for connecting to an internet port.

The control device 100 includes a signal pin SELJ. The north bridge chip 200 includes two pins NSCKE_A0 and NSCKE_B0. The bus switch circuit 300 includes an inverter 110, and two bus switch chips U10 and U20. The bus switch chips U10 and U20 each includes a power pin Vcc, an enable pin OE1, an input pin 1A, an output pin 1B, an enable pin OE2, an input pin 2A, an output pin 2B, and a ground pin GND. The pin OE1 is configured for controlling a connection between the pin 1A and 1B. The pin OE2 is configured for controlling a connection between the pin 2A and 2B. The memory 400 includes a pin MSCKE_A0, and is activated when the pin MSCKE_A0 receives a high level signal. The memory 500 includes a pin MSCKE_B0, and is activated only when the pin MSCKE_B0 receives a high level signal.

The signal pin SELJ is connected to the pin OE1 of the bus switch chip U10, the pin OE2 of the bus switch chip U20, and an input terminal of the inverter 110. An output terminal of the inverter 110 is connected to the pin OE2 of the bus switch chip U10 and the pin OE1 of the bus switch chip U20.

The pin NSCKE_A0 of the north bridge chip 200 is connected to the pin 1A of the bus switch chip U10. The pin 1B of the bus switch chip U10 is connected to the pin 1B of the bus switch chip U20 and the pin MSCKE_A0 of the memory 400. The pin NSCKE_B0 of the north bridge chip 200 is connected to the pin 2A of the bus switch chip U10. The pin 2B of the bus switch chip U10 is connected to the pin 2B of the bus switch chip U20 and the pin MSCKE_B0 of the memory 500.

The power pins Vcc of the bus switch chips U10 and U20 are connected to a voltage source Vcc. The ground pins GND of the bus switch chips U10 and U20 are grounded. The pins 1A and 2A of the bus switch chip U20 are grounded.

When the signal pin SELJ sends a high level signal, the pin OE1 of the bus switch chip U10 receives the high level signal and the memory 400 is activated. The pin 1A of the bus switch chip U10 is electrically communicating with the pin 1B of the bus switch chip U10. The north bridge chip 200 communicates with the internal network. The high level signal from the signal pin SELJ is converted to a low level signal through the inverter 110. The low level signal has a lower voltage than the high level signal. The pin OE2 of the bus switch chip U10 receives the low level signal, thereby interrupting the electrical communication between the pins 2A and 2B of the bus switch chip U10 so that the memory 500 cannot be activated. The pin OE2 of the bus switch chip U20 receives the high level signal. The pin 2A of the bus switch chip U20 is electrically communicating with the pin 2B of the bus switch chip U20. The pin 2B of the bus switch chip U20 and the pin MSCKE_B0 of the memory 500 are grounded. The memory 500 is grounded through the bus switch chip U20. The north chip 200 is insulated from the internet port.

When the signal pin SELJ sends a low level signal, the pin OE1 of the bus switch chip U10 receives the low level signal, thereby interrupting the electrical communication between the pins 1A and 1B of the bus switch chip U10 and the memory 400 cannot be activated. The low level signal from the signal pin SELJ is converted to the high level signal through the inverter 110. The pin OE1 of the bus switch chip U20 receives the high level signal. The pin 1A of the bus switch chip U20 is electrically communicating with the pin 1B of the bus switch chip U20. The pin 1B of the bus switch chip U20 and the pin MSCKE_A0 of the memory 400 are grounded. The memory 400 is grounded through the bus switch chip U20. The north chip 200 is insulated from the internal network. The pin OE2 of the bus switch chip U10 receives the high level signal. The pin 2A of the bus switch chip U10 is electrically communicating with the pin 2B of the bus switch chip U10. The memory 500 is activated. The north chip 200 communicates with the internet port.

Figure 2:
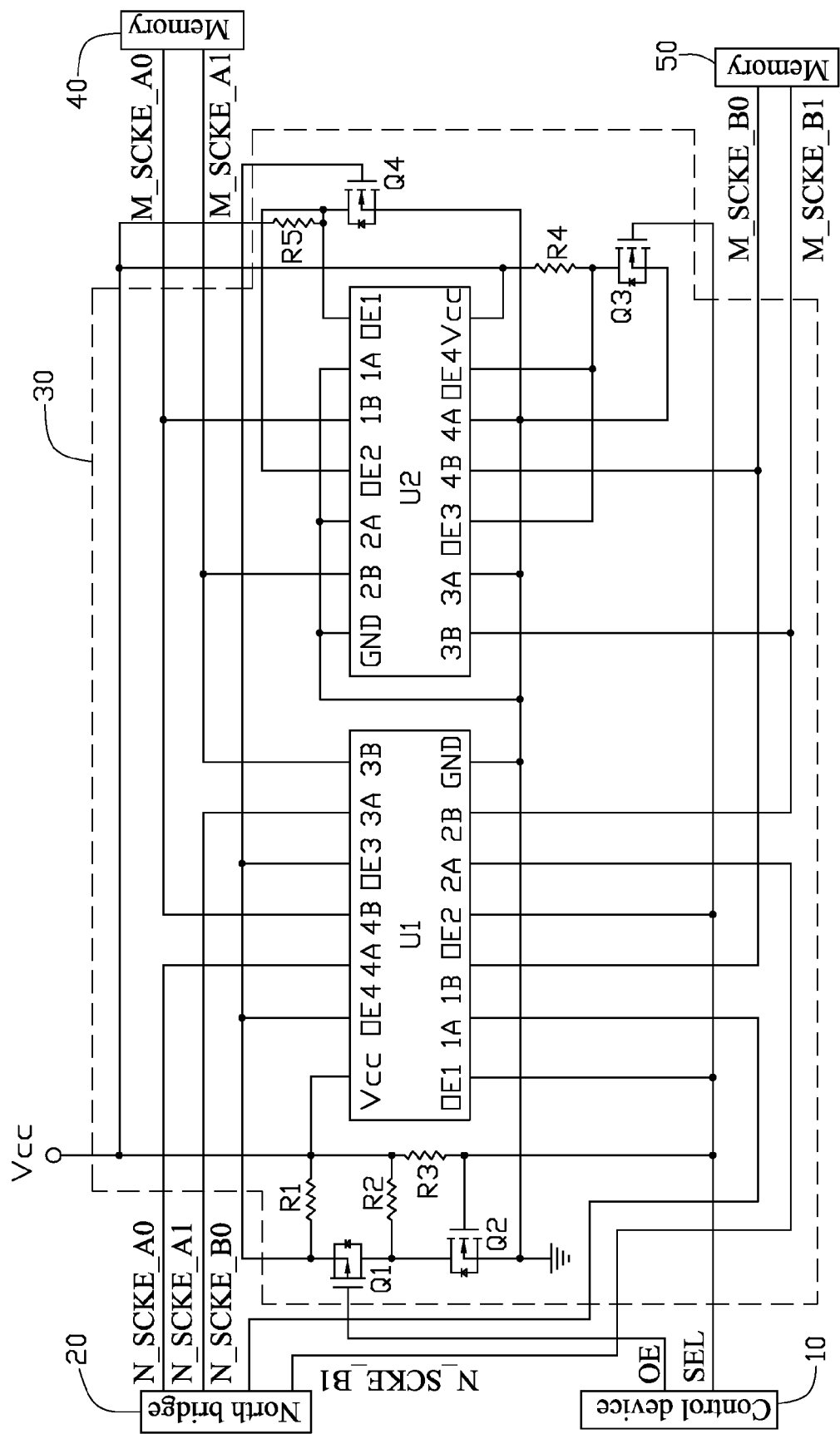
FIG. 2 is a circuit diagram of a second embodiment of a double network physical isolation circuit.

Referring to FIG. 2, a second embodiment of a double network physical isolation circuit includes a control device 10, a north bridge chip 20, a bus switch circuit 30, a first memory connected to the internal network, and a second memory 50 connected to the internet port.

The control device 10 includes a signal pin SEL and an enable pin OE. The north bridge chip 20 includes four pins N_SCKE_A0, N_SCKE_A1, N_SCKE_B0, and N_SCKE_B1. The bus switch circuit 30 includes four field effect transistors (FETs) Q1, Q2, Q3, and Q4, five resistors R1, R2, R3, R4, and R5, and two bus switch chips U1 and U2. In the second embodiment, the bus switch chips U1 and U2 each includes a power pin Vcc, an enable pin OE1, an input pin 1A, an output pin 1B, an enable pin OE2, an input pin 2A, an output pin 2B, an enable pin OE3, an input pin 3A, an output pin 3B, an enable pin OE4, an input pin 4A, an output pin 4B, and a ground pin. The pin OE1 is configured for controlling a connection between the pins 1A and 1B. The pin OE2 is configured for controlling a connection between the pins 2A and 2B. The pin OE3 is configured for controlling a connection between the pins 3A and 3B. The pin OE4 is configured for controlling a connection between the pins 4A and 4B. In the second embodiment, the FET Q1 is a P-Channel metal oxide semiconductor field effect transistor (MOSFET). The FETs Q2, Q3, and Q4 are N-Channel MOSFETs. The FETs Q1, Q2, Q3, and Q4 each comprises a gate, a drain, and a source. In another embodiment, the FETs Q1, Q2, Q3, and Q4 may be other types of switch elements. The memory 40 includes two pins M_SCKE_A0 and M_SCKE_A1, and is activated only when the pins M_SCKE_A0 and M_SCKE_A1 receive the high level signal. The memory 50 includes two pins M_SCKE_B0 and M_SCKE_B1, and is activated only when the pins M_SCKE_B0 and M_SCKE_B1 receive the high level signal.

The signal pin SEL of the control device 10 is connected to the pins OE1 and OE2 of the bus switch chip U1, and the gates of the FETs Q2 and Q3. The pin OE of the control device 10 is connected to the gate of the FET Q1.

The pin N_SCKE_A0 of the north bridge chip 20 is connected to the pin 4A of the bus switch chip U1. The pin 4B of the bus switch chip U1 is connected to the pin 1B of the bus switch chip U2 and the pin M_SCKE_A0 of the memory 40. The pin N_SCKE_A1 of the north bridge chip 20 is connected to the pin 3A of the bus switch chip U1. The pin 3B of the bus switch chip U1 is connected to the pin 2B of the bus switch chip U2 and the pin M_SCKE_A1 of the memory 40. The pin N_SCKE_B0 of the north bridge chip 20 is connected to the pin 1A of the bus switch chip U1. The pin 1B of the bus switch chip U1 is connected to the pin 4B of the bus switch chip U2 and the pin M_SCKE_B0 of the memory 50. The pin N_SCKE_B1 of the north bridge chip 20 is connected to the pin 2A of the bus switch chip U1. The pin 2B of the bus switch chip U1 is connected to the pin 3B of the bus switch chip U2 and the pin M_SCKE_B1 of the memory 50.

The source of the FET Q1 is connected to the pins OE3 and OE4 of the bus switch chip U1, and the gate of the FET Q4. The source of the FET Q1 is connected to the voltage source Vcc through the resistor R1 and the drain of the FET is connected to the voltage source Vcc through the resistor R2. The drain of the FET Q2 is connected to the drain of the FET Q1 and the source of the FET Q2 is connected to the ground. The gate of the FET Q2 is connected to the voltage source Vcc through the resistor R3. The power pins Vcc of the bus switch chips U1 and U2 are connected to the voltage source Vcc. The pins 1A, 2A, 3A, 4A, and GND of the bus switch chip U2 and the pin GND of the bus switch chip U1 are grounded. The pins OE1 and OE2 of the bus switch chip U2 are connected to the drain of the FET Q4. The pins OE3 and OE4 of the bus switch chip U2 are connected to the drain of the FET Q3. The sources of the FETs Q3 and Q4 are grounded. The drain of the FET Q3 is connected to the voltage source Vcc through the resistors R4 and the drain of the FET Q4 is connected to the voltage source Vcc through the resistors R5.

The control device 10 is configured for controlling the double network physical isolation circuit. An isolation function of the double network physical isolation circuit is activated only when the pin OE of the control device 10 receives a valid signal, for example, a low level signal. The FET Q1 turns on when the pin OE of the control device 10 receives the low level signal.

When the signal pin SEL of the control device 10 sends a low level signal, the FET Q2 turns off. The source of the FET Q1, the pins OE3 and OE4 of the bus switch chip U1, and the gate of the FET Q4 receive the high level signal. The pin 3A of the bus switch chip U1 is electrically communicating with the pin 3B of the bus switch chip U1. The pin 4A of the bus switch chip U1 is electrically communicating with the pin 4B of the bus switch chip U1. The memory 40 is activated. The north bridge chip 20 communicates with the internal network. The pins OE1 and OE2 of the bus switch chip U1 receive the low level signal, thereby interrupting the electrical communication between the pins 1A and 1B of the bus switch chip U1 and the electrical communication between the pins 2A and 2B of the bus switch chip U1 so that the memory 50 cannot be activated. The gate of the FET Q3 receives the low level signal. The FET Q3 turns off. The drain of the FET Q3, and the pins OE3 and OE4 of the bus switch chip U2 receives the high level signal. The pin 3A of the bus switch chip U2 is electrically communicating with the pin 3B of the bus switch chip U2. The pin 4A of the bus switch chip U2 is electrically communicating with the pin 4B of the bus switch chip U2. The pins 3B and 4B of the bus switch chip U2, and the pins M_SCKE_B0 and M_SCKE_B1 of the memory 50 receive the low level signal. The memory 50 is grounded through the bus switch chip U2. The north bridge chip 20 is insulated from the Internet.

When the signal pin SEL of the control device 10 sends a high level signal, the FET Q2 turns on. The source of the FET Q1, the pins OE3 and OE4 of the bus switch chip U1, and the gate of the FET Q4 receive the low level signal, thereby interrupting the electrical communication between the pins 3A and 3B of the bus switch chip U1 and the electrical communication between the pins 4A and 4B of the bus switch chip U1 so that the memory 40 cannot be activated. The FET Q4 turns off. The drain of the FET Q4, and the pins OE1 and OE2 of the bus switch chip U2 receive the high level signal. The pin 1A of the bus switch chip U2 is electrically communicating with the pin 1B of the bus switch chip U2. The pin 2A of the bus switch chip U2 is electrically communicating with the pin 2B of the bus switch chip U2. The pins 1B and 2B of the bus switch chip U2, and the pins M_SCKE_A0 and M_SCKE_A1 of the memory 40 receive the low level signal. The memory 40 is grounded through the bus switch chip U2. The north bridge chip 20 is insulated from the internal network. The pins OE1 and OE2 of the bus switch chip U1, and the gate of the FET Q3 receive the high level signal. The pin 1A of the bus switch chip U1 is electrically communicating with the pin 1B of the bus switch chip U1. The pin 2A of the bus switch chip U1 is electrically communicating with the pin 2B of the bus switch chip U1. The memory 50 is activated. The north bridge chip 20 communicates with the Internet.

The foregoing description of the exemplary embodiments has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A double network physical isolation circuit comprising:
   a bus switch circuit comprising a first bus switch chip comprising first input and first output pins and second input and second output pins, and a second bus switch chip;
   a first memory;
   a second memory; and
   a north bridge chip connected to the first memory through the first input and first output pins, and connected to the second memory through the second input and second output pins;

wherein the first memory and the second memory are connected to different networks; upon a condition that the bus switch circuit receives a high level signal, the first input pin is electrically communicating with the first output pin, the first memory is activated, and the second memory is grounded through the second bus switch chip; upon a condition that the bus switch circuit receives a low level signal, the second input pin is electrically communicating with the second output pin, the second memory is activated, and the first memory is grounded through the second bus switch chip; the low level signal has a lower voltage than the high level signal.

2. The double network physical isolation circuit of claim 1, wherein the high and low level signals are outputted by a control device.

3. The double network physical isolation circuit of claim 2, wherein the control device is configured for controlling the first input pins and the first output pins, and controlling the second input pins and the second output pins through an inverter; upon a condition that the control device sends the high level signal to the bus switch circuit, the high level signal is converted to the low level signal, the second input pin is not in electrical communication with the second output pin, and the second memory cannot be activated; upon a condition that the control device sends the low level signal to the bus switch circuit, the first input pin is not in electrical communication with the first output pin, and the first memory cannot be activated.

4. A double network physical isolation circuit comprising:
   a bus switch circuit comprising:
      a first bus switch chip comprising:
         a first input pin, a first output pin, a second input pin, a second output pin, a third input pin, a third output pin, a fourth input pin, and a fourth output pin; and
      a second bus switch chip;
   a first memory;
   a second memory; and
   a north bridge chip connected to the first memory through the third input pin, the third output pin, the fourth input pin, and the fourth output pin;
   wherein the first memory and the second memory are connected to different networks; a north bridge chip is connected to the second memory through the first input pin, the first output pin, the second input pin, and the second output pin; upon a condition that the bus switch circuit receives a high level signal, the first input pin is electrically communicating with the first output pin, the second input pin is electrically communicating with the second output pin, the second memory is activated, and the first memory is grounded through the second bus switch chip; upon a condition that the bus switch circuit receives a low level signal, the third input pin and third output pin are electrically communicating with each other, the fourth input pin is electrically communicating with the fourth output pin, the first memory is activated, and the second memory is grounded through the second bus switch chip; the low level signal has a lower voltage than the high level signal.

5. The double network physical isolation circuit of claim 4, further comprising a control device comprising a control device signal pin and a control device enable pin, wherein the high level signal and the low level signal are outputted by the control device.

6. The double network physical isolation circuit of claim 5, wherein the bus switch circuit further comprises a first field effect transistor (FET), a second FET, a third FET, a fourth FET, a first resistor, a second resistor, a third resistor, a fourth resistor, and a fifth resistor; each FET comprises a gate, a drain, and a source; the gate of the first FET is connected to the control device enable pin; the first FET turns on upon a condition that the control device enable pin receives a valid signal; the source of the first FET is connected to a voltage source through the first resistor and the drain of the first FET is connected to a voltage source through the second resistor; the drain of the second FET is connected to the drain of the first FET and the source of the second FET is connected to ground; the gate of the second FET is connected to the voltage source through the third resistor and the drain of the third FET is connected to the voltage source through the fourth resistor; the gate of the third FET is connected to the control device signal pin, and the source of the third FET is ground; the gate of the fourth FET is connected to the source of the first FET, and the source of the fourth FET is ground; the drain of the fourth FET is connected to the voltage source through the fifth resistor; the gate of the third FET is further connected to the first bus switch chip; the drain of the third FET and the drain of fourth FET are further connected to the second bus switch chip; the control device signal pin directly controls the first input and first output pins, the second input and second output pins, and the gate of the third FET; the control device signal pin controls the third input and third output pins, the fourth input and fourth output pins, and the gate of the fourth FET through the source of the first FET; upon a condition that the control device sends the low level signal to the bus switch circuit, the first input pin is not in electrical communication with the first output pin, the second input pin and second output pin, and the second memory cannot be activated; the gate of the third FET receives the low signal, the third FET turns off, the drain of the third FET receives the high level signal, and the second memory is grounded through the second bus switch chip; the second FET turns off, the drain of the second FET and the source of the first FET receive the high level signal, the third input pin is electrically communicating with the third output pin are electrically communicating with each other, the fourth input pin is electrically communicating with the fourth output pin, and the first memory is activated.

7. The double network physical isolation circuit of claim 6, wherein upon a condition that the control device sends the high level signal to the bus switch circuit, the first input pin is electrically communicating with the first output pin, the second input pin is electrically communicating with the second output pin, the second memory is activated, the second FET turns on, the drain of the second FET and the source of the first FET receive the low level signal, the third input pin is not in electrical communication with the third output pin, the fourth input pin is not in electrical communication with the fourth output pin, the first memory cannot be activated, the gate of the fourth FET receives the low level signal, the fourth FET turns off, the drain of the fourth FET receives the high level signal, and the first memory is grounded through the second bus switch chip.

* * * * *